INVENTOR.
JOHN D. NICKERSON

ATTORNEY

United States Patent Office
3,083,111
Patented Mar. 26, 1963

3,083,111
FURNACE LINING BRICK
John D. Nickerson, Lakeland, Fla., assignor to Union Carbide Corporation, a corporation of New York
Filed June 20, 1960, Ser. No. 38,692
7 Claims. (Cl. 106—56)

This invention relates to carbon bricks for use as lining in metal producing apparatus. It more particularly refers to such linings which are resistant to alkali attack.

Slag is very often a necessary consequence of the reduction of ores to produce metals. It has a high alkali content which has in the past caused much damage to the carbon bricks used to line apparatus in which this reduction takes place. This damage is particularly prevalent at high temperatures and results in expansion of the brick in question sometimes to a degree such that the brick will crack, chip, or split. Iron ore reduction blast furnaces and pot type aluminum electrolytic cells are exemplary of forms of apparatus wherein this invention has been found to be useful.

It is known that an article made wholly of graphite will resist alkali attack even at elevated temperatures. However, graphite is a rather expensive material by comparison to amorphous carbon and its use as a metal reduction vessel lining is therefore somewhat limited. Further graphite has a much higher thermal conductivity than amorphous carbon and this property is not particularly desirable in this connection since it is important to retain rather than transmit heat.

It is therefore one of the principal objects of this invention to provide relatively low cost amorphous carbon articles which are resistant to alkali attack even at temperatures encountered during metal ore reducing operations.

Another object of this invention is to incorporate a material into a carbon article which will render such article resistant to alkali attack.

A further object of this invention is to provide a method of making such an article.

These objects are fulfilled by this invention which includes a carbon furnace lining brick having a silicic material incorporated therein thereby rendering such resistant to alkali attack even at elevated temperatures of about 800° C. to 1200° C. A silicic material as used herein is defined as either silicon, mechanical mixtures of silicon with other materials or a material consisting of, or containing silica. A carbon brick as defined herein includes such an article made wholly of amorphous carbon and a carbonizable binder or a similar article composed of a combination of comminuted graphite, amorphous carbon and a carbonizable binder which have been baked to carbonize the binder thereby forming a dimensionally stable article but which have not been graphitized.

Figure 1:
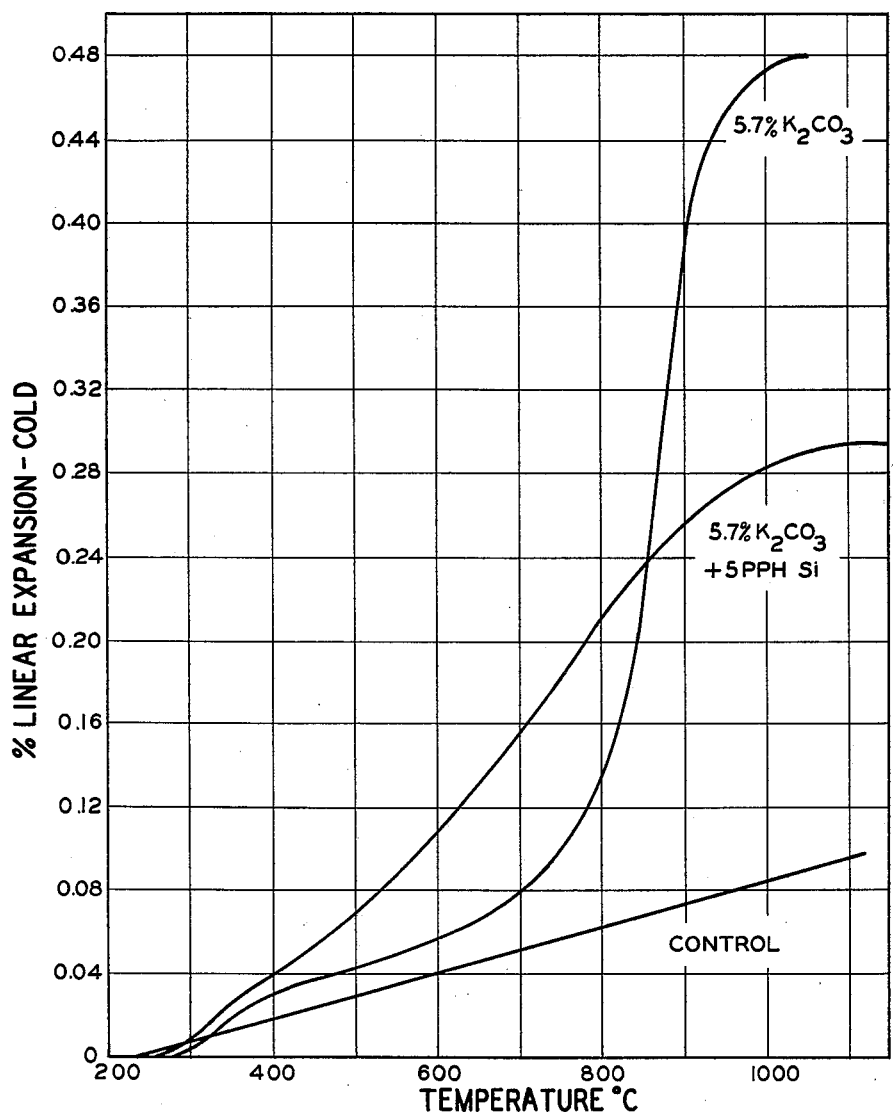
Figure 2:
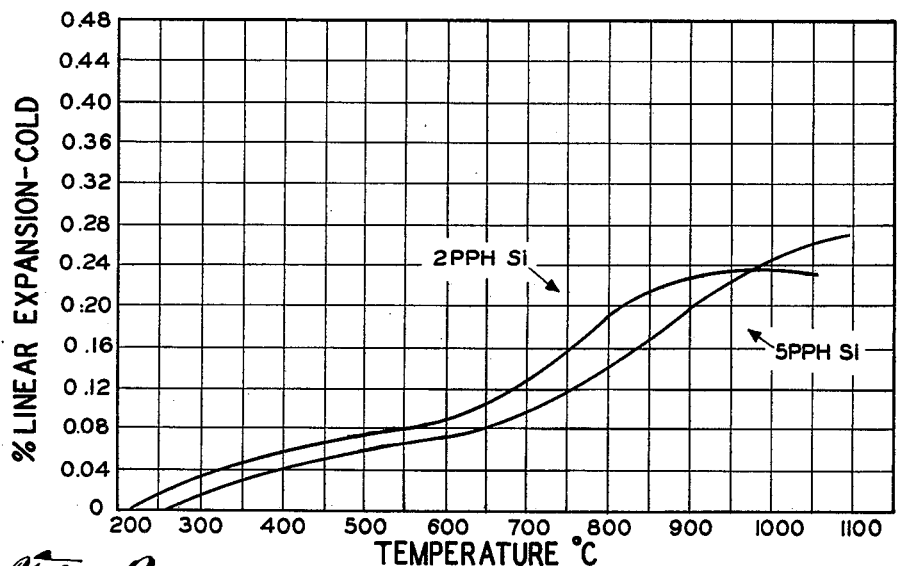
Figure 3:
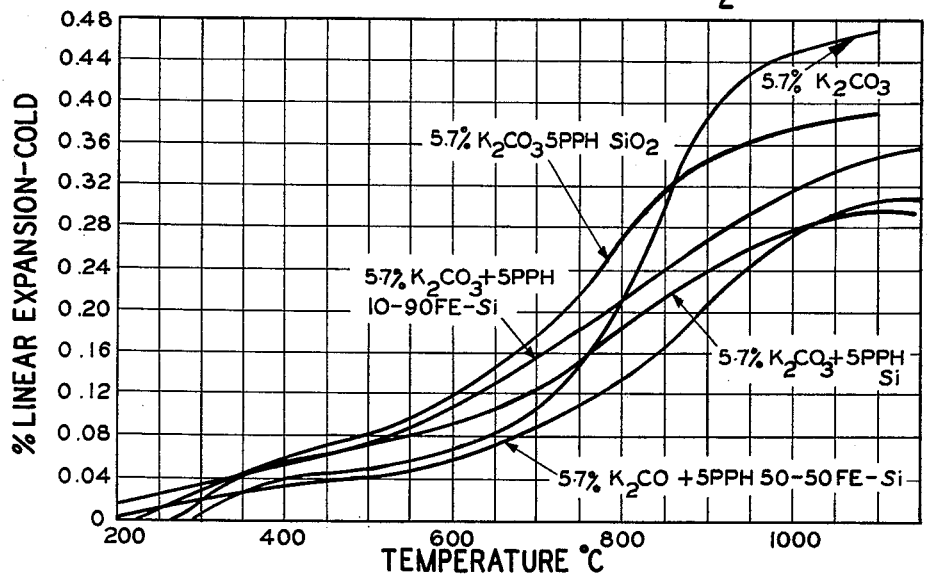

Understanding of this invention will be facilitated by reference to the accompanying drawing wherein:

FIG. 1 is a set of curves comparing properties of carbon bodies with and without a silicic additive, exposed to alkali attack, whereon percent linear expansion has been plotted against temperature;

FIG. 2 is a set of curves comparing properties of carbon bodies containing two different concentrations of elemental silicon which have been exposed to alkali attack, whereon percent linear expansion has been plotted against temperature; and FIG. 3 is a set of curves comparing the expansion of carbon bodies with additives of various silicic materials, exposed to alkali attack, whereon percent linear expansion has been plotted against temperature.

While the reaction mechanism is not completely understood, it has been proposed that it is the silicon in silicic materials which reacts with the alkali to prevent it from attacking the carbon brick. Substantially any silicic material, as defined above is operable in the practice of this invention however the most useful materials found to date are ferro-silicon alloys, elemental silicon, and silica. This list of useful materials is intended as exemplary of and not as limiting this invention.

The addition of a silicic material, as defined above, should be of such quantity as will give the effective equivalent of 2 to 5 percent silicon at alkali attack temperatures, e.g. 800° C. to 1200° C. It has been found that such a concentration of silicic additive reduces the overall expansion of carbon bricks as a result of alkali attack by a factor of two. While it is preferred to make bricks for lining metal reduction apparatus out of substantially all amorphous carbon, it is also practical to include a certain amount of graphite in such a brick. The graphite content of such a brick is preferably not higher than 60 percent. In no event, however, is it practical to make a brick for lining metal reduction apparatus which is wholly graphitized for the reasons expressed above.

A brick for use in a lining according to this invention may be made by impregnating a finished carbon article with the appropriate silicic material as pointed out above. It has been found to be more practical, however, to dry blend the particular silicic material to be used into the green carbon mix; add an appropriate carbonizable binder; and bake an article shaped from this composite to an appropriate carbonizing temperature. As will be appreciated, the manufacture of an article for use in this invention generally follows standard practice in the carbon industry and for this reason it is readily acceptable to the industry.

More specifically, five parts of a 50% iron–50% silicon alloy, milled to a fineness such that 100 percent passed through a 200 mesh (Tyler standard) screen, 100 parts of petroleum coke flour, milled to a fineness such that 100 percent passed through a 65 mesh screen, and 30 parts of a pitch binder were thoroughly blended, formed into bricks and baked to about 1100° C. Some of these articles were subjected to alkali attack according to tests to be described below.. The results of these tests are plotted in the accompanying drawing, for comparison purposes, with data taken by the same test procedures on other samples.

Alkali attack was determined by dilatometer measurements on 4 inch long by 5⁄8 inch diameter rods. The alkali attack was artificially caused by impregnation with a 30 percent potassium carbonate solution to a dry pickup of 5.7 percent potassium carbonate left in each rod. In each instance, control rods of carbon identical to those tested for alkali resistance were prepared. The data for the accompanying figures were obtained by heating both the control rods and the treated rods to as high as 1200° C. and noting the expansion that occurred.

In FIG. 1 the data shows the effect of silicon on alkali attack. FIG. 2 shows the range of silicic material concentration applicable to this invention. FIG. 3 shows data taken for various silicic additives showing the increased protection against alkali attack afforded by each silicic material.

Tests have also been run to determine the type of carbon article susceptible to the protection afforded by a silicic material against alkali attack. When subjected to the test described above, a calcined coat article containing 5 percent silicon showed a reduction in alkali attack of about 50 percent and a petroleum coke base article with 5 percent silicon showed a reduction in alkali attack of about 45 percent. An article consisting of 60 percent graphite and 40 percent anthracite coal which contained about 3 percent silica withstood alkali attack at 450° C. by fused potassium hydroxide for about 4 hours with no visible puffing or expansion while a 50 percent graphite, 50 percent anthracite coal article containing less than 1 percent silica was found to be severely cracked and split after the same time at the same temperature. This shows the added protection afforded mixed carbon-graphite articles by silicic additive.

It was sought to determine if silicic material were the only ones effecting this protection against alkali attack by subjecting carbon articles having 5 percent additive of various metals to the tests described above. A summary of the data taken from these tests appears in Table I below. In each of these cases the metal was added to the carbon-binder mix and an article suitably formed and baked. Each of the additives was in the form of a powder, 100 percent of which passed through a 200 mesh (Tyler standard) screen. Potassium carbonate impregnation as described above was the alkali used. In each case the comparative data on protection is reported as a ratio of expansion of a rod containing the metal being tested to a pure carbon rod. It should be noted that the higher this ratio is, the lower is the protection afforded by the additive against alkali attack. A ratio higher than 1 indicates actual increased attack over that of a rod having no additive.

*Table I*

| Additive: | Ratio of expansion |
|---|---|
| Copper | 2.0 |
| Nickel | 1.8 |
| Zinc | 1.3 |
| Chromium | 1.1 |
| Silicon | 0.62 |

This table clearly shows that the metal additives tested, only silicon afforded any protection at all against alkali attack, while the other metals aggravated the alkali attack on the carbon.

This application is a continuation-in-part of application Serial No. 746,006, filed July 1, 1958, now abandoned.

What is claimed is:

1. The method of making an alkali resistant lining for a metal ore reducing apparatus comprising blending amorphous carbon, a carbonizable binder, up to 60 weight percent graphite and a silicic material selected from the group consisting of silicon, silica, and ferrosilicon alloys in an amount sufficient to contribute the effective equivalent of at least 2 weight percent silicon to said lining when said lining is heated to a temperature in the range from about 800° C. to 1200° C. in the presence of alkali; forming said blend into a brick and baking said brick to at least 1000° C. in a non-oxidizing environment.

2. The method according to claim 1 wherein there is substantially no graphite in said blend.

3. An alkali resistant lining brick for use in metal ore reduction apparatus composed of carbon and having a silicic material therein selected from the group consisting of silicon, silica, and ferro-silicon alloys in a proportion sufficient to contribute the effective equivalent of 2 to 5 weight percent silicon to said brick when said brick is heated at 800° C. to 1200° C. in the presence of alkali, said silicic material effectively inhibiting alkali attack on said brick at elevated temperatures.

4. A furnace lining brick as described in claim 3 containing substantially no graphite.

5. An alkali resistant lining brick for use in metal ore reduction apparatus composed of carbon and having silicon therein in a proportion sufficient to contribute 2 to 5 weight percent thereof when said brick is heated to 800° C. to 1200° C. in the presence of alkali, said silicon being effective to inhibit alkali attack on said brick at elevated temperatures.

6. An alkali resistant lining brick for use in metal ore reduction apparatus composed of carbon and having silica present therein in a proportion sufficient to contribute the effective equivalent of 2 to 5 weight percent silicon to said brick when said brick is heated to 800° C. to 1200° C. in the presence of alkali, said silica effectively inhibiting alkali attack on said brick at elevated temperatures.

7. An alkali resistant lining brick for use in metal ore reduction apparatus composed of carbon and having a ferro-silicon alloy therein in a proportion sufficient to contribute the effective equivalent of 2 to 5 weight percent silicon to said brick when said brick is heated to 800° C. to 1200° C. in the presence of alkali, said ferro-silicon alloy effectively inhibiting alkali attack on said brick at elevated temperatures.

References Cited in the file of this patent

UNITED STATES PATENTS

| 2,013,625 | Buck | Sept. 3, 1935 |
| 2,104,841 | White | Jan. 11, 1938 |
| 2,772,176 | Leitten | Nov. 27, 1956 |
| 2,812,275 | Francisco et al. | Nov. 5, 1957 |

FOREIGN PATENTS

| 688,126 | Great Britain | Feb. 25, 1953 |